Figures 1, 2:
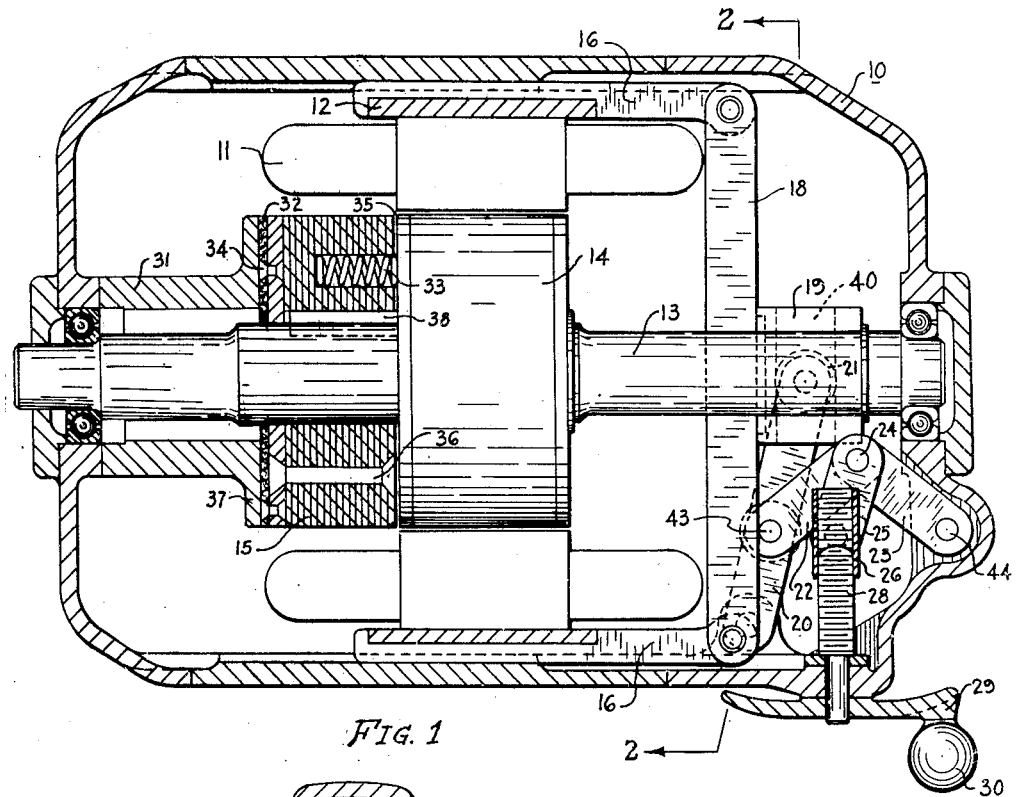

Patented Dec. 6, 1949

2,490,456

UNITED STATES PATENT OFFICE 2,490,456

MOTOR AND BRAKE DEVICE

Floyd E. Niederhiser, Cleveland, Ohio

Application September 16, 1947, Serial No. 774,241

2 Claims. (Cl. 172—36)

My invention relates to electric motor construction in general, and in particular to variable power motors with brake means.

This application constitutes a continuation in part of my application for Variable torque motor, Serial Number 635,227, filed December 15, 1945.

Variable torque motors are generally used to position a driven object within close limits. The power is adjusted to the desired amount, and turned off close to the desired stopping point. However, in recent years some applications have been developed which require a rather high torque to start movement of the object, whereafter the object is loosened and is thereafter easily rotatable. The actuating mechanism of a lathe chuck is an example. To align a workpiece in a lathe chuck, the actuating screw of the chuck must be turned a determined amount and no more. Therefore, if a power wrench is used, the torque must be accurately determined, and the rotation of the motor must be stopped within close limits. If the motor is allowed to coast after the current has been stopped, the actuating screw of the chuck will be turned too far and the chuck will be overcompensated and therefore will be out of line in the opposite direction. Furthermore, it is essential that the torque of the motor be accurately controlled in order to prevent crushing of a workpiece. The braking mechanism is also useful in preventing the continuance of motor rotation which would tend to crush a lightweight workpiece.

Therefore, an object of my invention is to provide an electric motor construction in which the rotor of the motor is adjustably exposed in varying degrees to the influence of an electrical field.

Another object of my invention is to provide an automatic brake device which will be responsive to the magnetic field of the motor for releasing the brake, and will be applied to stop rotation of the motor shaft upon cessation of the magnetic field.

Another object of my invention is the provision of an electrical stator and a rotor in an electric motor which may be adjustably varied with respect to one another to control the amount of torque produced in the rotor.

Another object of my invention is the provision of an electrical stator and a rotor in an electric motor which may be adjustably varied with respect to one another to control the amount of torque produced in the rotor, and a non-driving flux conducting member to conduct some of the flux across the flux field when the rotor and stator are moved longitudinally apart and thereby stabilize the magnetizing current to prevent overheating.

A still further object of my invention is to provide a flux conducting member on the shaft of a motor mounted for reciprocation upon the shaft but non-rotative with respect to the shaft, which flux conducting member will be magnetically attracted to the rotor of the motor when the motor is in operation, and which will be movable away from the rotor when the motor field is unexcited, and therefore the flux conducting member will automatically operate to actuate a brake device to stop the rotation of the shaft upon cessation of the exciting of the stator field.

Other objects and a fuller understanding of my invention may be had by referring to the following description and claims, taken in conjunction with the accompanying drawing, in which:

Figure 1 is a longitudinal cross-sectional view through a variable torque motor of my improved design, and including my improved brake mechanism, with portions broken away for illustration: and Figure 2 is a cross-sectional view through the line 2—2 of Figure 1.

Many industrial uses require power units and prime movers having the ability to supply a driving torque in various degrees as desired. To meet this demand, industry has provided direct current machines and alternating current machines having controls thereon to control the amount of the voltage applied to the machines. Also, various brush controlling devices and other cumbersome equipment have been devised for this purpose. However, most of these devices are cumbersome and energy consuming, and at best, are expensive and unsatisfactory for general application.

My improved invention is directed to the problem of supplying a chosen amount of torque from a motor for a chosen period of time through an extremely simple adjustable arrangement of the internal parts thereof, and to supplement the correct torque with quick and automatic stopping means.

Electric motors comprise basically a wound stator to produce a revolving electrical field. Within the revolving electrical field, a rotor is employed to be rotated by the influence of the revolving electrical field. This rotor, then, in turn drives a shaft to supply mechanical energy. The stator of the machine produces a magnetic influence commonly referred to as the magnetic flux. This magnetic flux is easily conducted by certain types of metal, such for example as common iron laminations. Other mediums, such for example as air, are highly resistant to the passage of the magnetic flux. Therefore, the amount of space between the rotatable rotor and the fixed stator is usually as small as mechanically feasible, and the magnetic flux produced by the stator is readily induced into the rotor across the small air gap allowed. The stator generally comprises a laminated pack of iron sheets, and has a plurality of windings mounted thereon usually comprising many turns of copper wire. The turns of copper wire induce the magnetic flux into the laminated stator pack rather than into the surrounding air because of the much better conductive quality of the iron than the air. Therefore, the magnetic flux will travel across the very small air gap between the stator pack and the rotor and will be induced into the rotor. The stator pack and the rotor are generally of substantially the same longitudinal length. Also, the torque produced by the rotor is necessarily dependent upon the amount of the magnetic flux induced therein by the stator. Therefore, if the rotor is so small that a large air gap is left between the stator pack and the rotor, a greatly decreased amount of flux will be induced into the rotor with proportionate reduction in the torque output of the motor.

My invention contemplates the longitudinal shifting of a rotor and a stator pack with respect to one another in order to vary the amount of magnetic flux induced therein. However, although a simple longitudinal shifting of the rotor is entirely feasible and operable to limit the amount of magnetic flux induced therein, with a motor in which it is desired to greatly reduce the amount of torque, and therefore in which the rotor will be moved a correspondingly greater distance, the remaining magnetic flux of the stator pack will attempt to enter into the correspondingly smaller amount of the rotor remaining in adjacent relationship thereto. That is, a greatly increased current flow. This increased flow, of course, if carried on for any lengthy period of time, will cause undue and excessive heating in both the stator and the rotor. Therefore, in motors which are to be used at considerably reduced torque capacities, I have provided for means to "absorb" the excess magnetic flux over that which is desired to enter into the rotor, and thereby stabilize the magnetizing current to maintain the electrical characteristics of the stator well within the limit of normal operating conditions to prevent the undesired heating of both the stator and the rotor.

This means employed to absorb or drain off the excessive magnetic flux is preferably provided by a flux conducting member 15 which will enter into the revolving electrical field produced by the stator when the stator is withdrawn. That is, as the stator and rotor of the motor are shifted longitudinally with respect to one another, my invention contemplates the insertion of the flux conducting member to fill the area in the revolving electrical field that would be left vacant by the shifting. The flux conducting member 15 is preferably of a material which will readily conduct the magnetic flux, but is provided in such a form that the absorption of the magnetic flux will not be converted into rotative force to drive the shaft. Of course, there are many ways in which this might be accomplished, but I have found that the preferable method is to provide a flux conducting member of substantially the same cross-sectional outline as the rotor itself, and non-rotatively, but longitudinally shiftably mounted upon the motor shaft longitudinally adjacent to the rotor. Therefore, as the longitudinal relationship of the rotor and the stator pack is changed, the flux conducting member 15 will be in position to conduct a portion of the magnetic flux and correspondingly reduce the amount of the magnetic flux induced into the rotor, and thereby reduce the torque output of the motor.

In the adaptation of my invention to practice, I have derived the preferred embodiment, as illustrated in the drawing. The embodiment illustrated in the drawing is considered to be the preferred embodiment because of its balance of utility and manufacturing cost. The illustrated embodiments are not considered to be necessarily either the most ideal or the most economical embodiments. Rather, it is a convenient balance of the two principles. Many other forms of the basic conception might well be employed with satisfying results.

With reference to the Figure 1, I illustrate a motor frame 10 to enclose the working parts of a common polyphase A. C. motor. The motor operates on the basic principles of such electrical machines and includes a stator 11 mounted within a mounting ring 12 which is annular in form. The mounting ring 12, in the illustrated embodiment, is a continuous annular band in which the motor stator is held as a unit. That is, the stator 11 may be moved and handled by the application of force to the mounting ring 12.

Extending longitudinally of the motor frame 10, is a shaft 13 suitably bearinged at either end in any convenient manner. A rotor 14 is carried by the shaft 13 and is secured thereto in such a manner that rotary force may be exerted by the rotor 14 to drive the shaft 13. As illustrated, the rotor 14 comprises a conventional squirrel cage concealed bar rotor. Of course, the illustrated squirrel cage rotor is used only for the purpose of setting forth my invention and is entirely of conventional design. It may readily be replaced by other suitable rotors, either of the induction type or of the wound externally excited type.

As best seen in the Figure 2, the motor frame 10 is formed to provide two longitudinal grooves diametrically opposite from one another on the internal side of the frame. These grooves are indicated by the reference character 17 and are employed to serve as a guide for a pair of grip arms 16. The grip arms 16 are of a hook-like nature and are adapted to interfit across the mounting rings 12. That is, the longitudinal groove 17 serves as a base in which the grip arms 16 may be longitudinally slidably reciprocated, and the grip arms 16 in turn support the mounting ring 12 which holds the stator 11. Therefore, by moving the grip arms 16 longitudinally within the grooves 17, the entire stator 11 may be moved longitudinally within the motor frame 10.

The Figure 2 illustrates the means which I have chosen to longitudinally operate the grip arms 16. Two cross arms 18 extend across the frame 10 and interconnect the grip arms 16. Thus, force applied to the cross arms 18 will serve to actuate the grip arms 16 and longitudinally shift the stator 11 within the frame 10.

To move the cross arms 18 to shift the stator 11 as described, I have provided a toggle arrangement operable from the exterior of the frame 10. This toggle arrangement includes a drive connecting member suitably secured to the cross arms 18, such as by welding. Actually, the drive connecting member, in this specific embodiment, comprises two plate members 19 each having a groove 40 therein as illustrated. Two drive arms 20 are provided, and are pivoted to the frame 10 by pivot pins 42. The drive arms 20 interconnect with the plate members 19 by means of rollers 21. The rollers 21 are adapted to operate in the grooves 40 to compensate for the change in position of the free end of the drive arms 20 when actuated by the toggle arrangement. Toggle arms 22 and 23, and links 25 are pivotally secured together by a pin 24 to form a driver for the toggle arrangement. The toggle arms 22 are pivoted to the drive arms 20 by pins 43 intermediate the ends of the drive arms 20. Also, the free ends of the toggle arms 23 are pivotally secured to the motor frame 10 by pins 44, as illustrated. Thus, force applied downwardly to the links 25 will tend to increase the distance between the pivot pins 43 and 44 and swing the drive arm 20 to the left from the position illustrated. Such movement will move the stator 11 toward the flux conducting member 15 and away from the rotor 14.

To conveniently apply moving force to the links 25, I have provided for a tubular member 26 to be threaded internally and be secured to the links 25 by means of pins. An actuating screw 28 is threadably engaged to the internal threads of the member 26 and is rotatably moved by a suitable index lever 29. A handle 30 on the lever 29 serves as a hand grip to turn the lever 29 and apply force to the toggle arrangement through the member 26 and the links 25.

In operation, therefore, the lever 29 may be rotated by means of the handle 30 to move the links 25 and apply force to the pivotal connecting point between the toggle arms 22 and 23. From the position indicated in the Figure 1, any movement of the pivotal connection between the members 22 and 23 will tend to increase the distance between the pivot pins 43 and 44 and cause the drive arms 20 to move about the pivot pin 42 toward the left in the illustration. In so moving, the drive arm 20 will force the drive connecting plate members 19 to move longitudinally of the motor frame 10 and push the cross arms 18 and the grip arms 16 therealong. Of course, the grip arms 16 then move the motor stator longitudinally relative to the rotor 14.

It will readily be seen, with reference to the Figure 1 of the drawing, that any movement longitudinally of the motor frame 10 by the stator 11 will cause the rotating electrical field produced by the stator 11 to be shifted longitudinally towards the flux conducting member 15. Immediately, an increased portion of the magnetic flux produced by the stator 11 will be conducted across the short air gap into the member 15. Thus, the flux entering the rotor 14 will be correspondingly reduced. If this movement of the stator 11 were continued until the stator 11 were positioned exactly correspondingly to the flux conducting member 15, the power of the motor would be completely destroyed. Therefore, the indexing lever 29 may be suitably marked to indicate the appropriate position to which it may be moved to cause the desired amount of longitudinal movement of the stator 11. Thus, only a desired amount of reduction in the torque of the motor will be produced.

In Figure 1 of the drawing, I illustrate the flux conducting member 15 as being constructed of laminations held together by suitable rivets 36. The flux conducting member 15 is held against rotation relative to the shaft 13 by means of a longitudinal key 38, but the key 38 allows the flux conducting member 15 to reciprocate longitudinally upon the shaft 13.

A brake shoe 31 is secured to the frame 10, and surrounds the end of the shaft 13. In other words, the brake shoe 31 is an annular member surrounding the end of the shaft 13, and is provided with a flange 37, having a brake surface on the end thereof. A suitable braking material 32 is secured to the end surface of the member 15 by suitable rivets 34. Therefore, the rotation of the shaft 13 may be stopped by tightly pressing the flux conducting member 15 toward the brake shoe 31 to produce a high friction between the brake material 32 and the brake surface of the flange 37.

I have provided three springs 33 to urge the member 15 toward the shoe 31 to provide the braking action described. In the Figure 1, only one of the springs 33 is illustrated, because the Figure 1 is a straight cross-sectional view. The springs 33 are positioned 120 degrees apart around the member 15, and press against the rotor 14. Thus, by the pressure applied to the flux conducting member 15 by the springs 33 pressing against the rotor 14, the brake material 32 is pressed against the brake surface of the flange 37 and the shaft 13 is quickly stopped. The brake shoe 31 and the flux conducting member 15 thereby serve as brake means to stop the shaft.

However, it will be noted that the member 15 is positioned within the area of magnetic flux field produced by the windings 11. Also, the member 15 is adapted to conduct magnetic flux. Therefore, when current is passed through the windings 11 to operate the motor, the member 15 will be attracted toward the stator field. However, the distance which the member 15 may move is physically limited by the rotor 14. In Figure 1, a clearance 35 is illustrated between the member 15 and the rotor 14. Therefore, the member 15 can move longitudinally against the urge of springs 33 on the shaft 13 the distance of the clearance 35. This movement will then produce a like clearance between the braking material 32 and the brake surface of flange 37. Therefore, the movement of the member 15 toward the rotor 14 will release the member 15 and the shaft 13 for free rotation. However, immediately upon cessation of current passing through the stator 11, the magnetic attraction upon the member 15 will cease, and the springs 33 will tightly press the material 32 against the brake surface of the flange 37 and stop the rotation of the shaft 13.

By this improved combination of elements as described, I have provided a variable torque motor capable of being quickly and easily adjusted to provide a desired torque, and which will automatically stop within a very short space of time when the current to the motor is turned off. All this is provided with the addition of very few parts more than a conventional electric motor. Further, the additions which have been made are of such a construction that they are almost beyond the necessity of ever needing maintenance, and certainly will not require any more service than a standard motor.

Although I have described my invention in its preferred form with a certain degree of particularity, it is understood that the present disclosure of the preferred form has been made only by way of example and that numerous changes in the details of construction and the combination and arrangement of parts may be resorted

I claim:

1. An adjustable torque and brakable electric motor comprising, a frame, a stator adapted to produce a magnetic flux field, a shaft rotatably mounted in said frame, a rotor drivingly mounted on said shaft in said flux field to drive the shaft under the influence of said flux field, said rotor having at least one radial plane surface area, a laminated flux conducting member mounted non-rotatively and longitudinally reciprocably on said shaft within the influence of said flux field, said flux conducting member having at least one radial plane surface substantially equal in area to the said plane surface area of the rotor, said plane surface area of the flux conducting member being placed relative to said plane surface area of the rotor for contact thereagainst upon movement of the flux conducting member toward said rotor, spring means adapted to urge said flux conducting member longitudinally away from said rotor and flux field, said flux conducting member being magnetically attracted toward said flux field against the urge of said spring means when said flux field is produced by said stator, shifting means to reciprocably shift the longitudinal position of the stator relative to the rotor and flux conducting member, said flux field thereby being at least partially diverted from the rotor to reduce the torque of the motor and directed to the flux conducting member to stabilize the magnetizing current, a brake shoe mounted on said frame and having a brake surface adjacent said flux conducting member, said flux conducting member having brake surfaces adapted to contact said brake surface of the brake shoe, whereby said brake surfaces may be urged apart by movement of the flux conducting member toward said flux field to allow free rotation of the shaft, and said brake surfaces may be urged to contact by movement of the flux conducting movement away from the flux field to stop the rotation of the shaft.

2. An adjustable torque and brakable electric motor comprising, a frame, a stator adapted to produce a magnetic flux field, a shaft rotatably mounted in said frame, a rotor drivingly mounted on said shaft in said flux field to drive the shaft under the influence of said flux field, said rotor having at least one end surface area extending generally transversely of the shaft, a laminated flux-conducting member mounted non-rotatively and longitudinally reciprocably on said shaft within the influence of said flux field, said flux-conducting member having at least one end surface area extending generally transversely of the shaft, said flux-conducting member having a diameter substantially equal to the diameter of the rotor, said end surface area of the flux conducting member facing said end surface area of the rotor, spring means adapted to urge said flux-conducting member longitudinally away from said rotor, said flux-conducting member being magnetically attracted toward said flux field against the urge of said spring means when said flux field is produced by said stator, shifting means to reciprocably shift the longitudinal position of the stator relative to the rotor and flux-conducting member, said flux field thereby being at least partially diverted from the rotor to reduce the torque of the motor and directed to the flux-conducting member to stabilize the magnetizing current, a brake shoe mounted on said frame and having a brake surface adjacent said flux-conducting member, said flux-conducting member having brake surfaces adapted to contact said brake surface of the brake shoe, whereby said brake surfaces may be urged apart by movement of the flux-conducting member toward said flux field to allow free rotation of the shaft, and said brake surfaces may be urged to contact by movement of the flux-conducting movement away from the flux field to stop the rotation of the shaft.

FLOYD E. NIEDERHISER.

REFERENCES CITED

The following references are of record in the file of this patent:

UNITED STATES PATENTS

| Number | Name | Date |
|---|---|---|
| 514,902 | Bradley | Feb. 20, 1894 |
| 1,134,739 | Handy | Apr. 6, 1915 |
| 1,508,100 | Hawley | Sept. 9, 1924 |
| 2,408,808 | Paulus et al. | Oct. 8, 1946 |

FOREIGN PATENTS

| Number | Country | Date |
|---|---|---|
| 468,826 | Great Britain | July 13, 1937 |
| 491,469 | Great Britain | Sept. 2, 1938 |
| 214,981 | Switzerland | Aug. 16, 1941 |